(12) United States Patent
Gatherer et al.

(10) Patent No.: US 7,099,414 B2
(45) Date of Patent: Aug. 29, 2006

(54) ORDERED DECODING IN WIRELESS COMMUNICATIONS THAT UTILIZE TURBO CODING AND TRANSMIT DIVERSITY

(75) Inventors: Alan Gatherer, Richardson, TX (US); Everest W. Huang, Cambridge, MA (US)

(73) Assignee: Texas Instruments Incorporated, Dallas, TX (US)

( * ) Notice: Subject to any disclaimer, the term of this patent is extended or adjusted under 35 U.S.C. 154(b) by 737 days.

(21) Appl. No.: 10/044,888

(22) Filed: Jan. 11, 2002

(65) Prior Publication Data

US 2003/0133523 A1 Jul. 17, 2003

(51) Int. Cl.
*H04B 7/06* (2006.01)
*H04L 1/06* (2006.01)

(52) U.S. Cl. .................. 375/347; 375/349; 375/299

(58) Field of Classification Search ............... 375/316, 375/347, 349
See application file for complete search history.

(56) References Cited

U.S. PATENT DOCUMENTS 6,584,593 B1 * 6/2003 Seshadri et al. ............ 714/752
6,671,338 B1 * 12/2003 Gamal et al. ............... 375/346

OTHER PUBLICATIONS

Wang et al. Iterative (Turbo) Soft Interference Cancellation and Decoding for Coded CDMA. IEEE Transactions on Communications, vol. 47, No. 7, Jul. 1999.*
Everest Huang, Alan Gatherer, Tarik Muharemovic, Dale Hocevar, "Improving Performance of a Space-Time Turbo Code in a Rayleigh Fading Channel", IEEE VTC Oct. 7, 2001.*
S. Benedetto, D. Divsalar, G. Montorsi, and F. Pollara, "A Soft-Input Soft-Output APP Module for Iterative Decoding of Concatenated Codes," *IEEE Communications Letters*, vol. 1, No. 1, pp. 22-24, Jan. 1997.
X. Li and J. A. Ritcey, "Bit-interleaved coded modulation with iterative decoding using soft feedback," *Electronic Letters*, vol. 34, pp. 169-171, Mar. 4, 1998.
Y. Liu, M. P. Fitz, and O. Y. Takeshita, "Qpsk space-time turbo codes," in *IEEE ICC*, Jun. 2000 (5 pages).

* cited by examiner

*Primary Examiner*—Temesghen Ghebretinsae
*Assistant Examiner*—Juan Alberto Torres
(74) *Attorney, Agent, or Firm*—Ronald O. Neerings; Wade James Brady, III; Frederick J. Telecky, Jr.

(57) ABSTRACT

In a wireless communication receiver (31) of a wireless communication system that utilizes transmit diversity and turbo coding, symbol decisions are based at least in part on a posteriori probabilities (47, 48) produced by SISO decoders (35, 36). These probabilities are produced iteratively in alternating fashion to support the symbol decision process. The SISO decoder associated with the weakest (92) wireless communication channel goes first (93) in the iterative process.

18 Claims, 4 Drawing Sheets

ORDERED DECODING IN WIRELESS COMMUNICATIONS THAT UTILIZE TURBO CODING AND TRANSMIT DIVERSITY

This application contains subject matter that is related to subject matter disclosed in copending U.S. Ser. Nos. 09/925,077 filed on Aug. 8, 2001 and 10/037,179 filed on Oct. 23, 2001.

FIELD OF THE INVENTION

The invention relates generally to wireless communications and, more particularly, to wireless communications that utilize turbo coding and transmit diversity.

BACKGROUND OF THE INVENTION

Each of the documents listed below is referred to herein by the corresponding number enclosed in square brackets to the left of the document. Each of these documents is also incorporated herein by reference.

[1] Y. Liu, M. P. Fitz, and O. Y. Takeshita, "Qpsk space-time turbo codes," in *IEEE ICC*, June 2000.
[2] X. Li and J. A. Ritcey, "Bit-interleaved coded modulation with iterative decoding, using soft feedback," *Electronic Letters*, vol. 34, pp. 942–943, 4 Mar. 1998.
[3] X. Li and J. A. Ritcey, "Bit-interleaved coded modulation with iterative decoding," in *IEEE ICC*, vol. 2, pp. 858–863, June 1999.
[4] X. Li and J. A. Ritcey, "Trellis-coded modulation with bit interleaving and iterative decoding," *IEEE Journal on Selected Areas in Communications*, vol. 17, pp. 715–724, April 1999.
[5] X. Li and J. A. Ritcey, "Bit-interleaved coded modulation with iterative decoding," *IEEE Communications* Letters, vol. 1, pp. 169–171, November 1997.

Coding and interleaving techniques are often used in wireless communication systems to improve the communication performance. FIG. 1 illustrates an example of a conventional wireless communication system described in [1]. This example implements turbo coding by using two convolutional coders (CC). One of the convolutional coders receives at its input the data stream that is to be transmitted, and the other convolutional coder receives at its input an interleaved (see 10) version of the data stream. The outputs of the convolutional coders are then modulated using QPSK (Quadrature Phase Shift Keying) and transmitted by respective transmit antennas. At the receiver, the signal from the antenna is input to a probability generator which generates symbol (or bit) probabilities. These symbol probabilities are fed to soft-input, soft-output (SISO) decoders that iterate to get estimates of the transmitted symbols (or bits). The SISO decoders use knowledge of the trellis of the convolutional coders to produce the estimates.

FIG. 2 illustrates an example of a conventional wireless communication system described in [2] and [3]. The system of FIG. 2 uses a single convolutional coder and an interleaver 21 before modulation and transmission by a single antenna. At the receiver, the signal from the antenna is demodulated and de-interleaved (see 22), and is then input to a SISO decoder. The a posteriori symbol probabilities output from the SISO decoder are interleaved (see 23) and fed back into the demodulator to get a better estimate of the symbol probabilities. This loop is iterated over. Systems similar to the one illustrated in FIG. 2 have also been suggested in [4] and [5], but those systems implement hard decoding decisions instead of soft decisions.

It is desirable in view of the foregoing to provide for improved performance in wireless communication systems that utilize turbo coding and transmit diversity.

According to the invention, in a wireless communication system with transmit diversity, a posteriori probabilities from SISO decoders are produced iteratively in alternating fashion to make symbol decisions. The SISO decoder associated with the weakest wireless communication channel goes first in the iterative process. This advantageously improves the symbol decisions.

DETAILED DESCRIPTION

Figure 1:
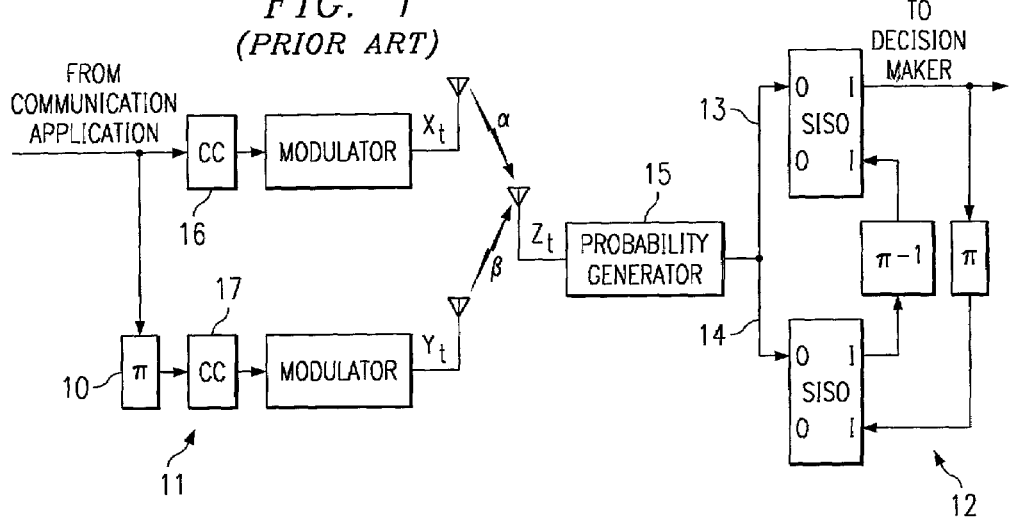
FIG. 1 illustrates a conventional wireless communication system which utilizes interleaving, turbo coding and transmit diversity.
Figure 2:
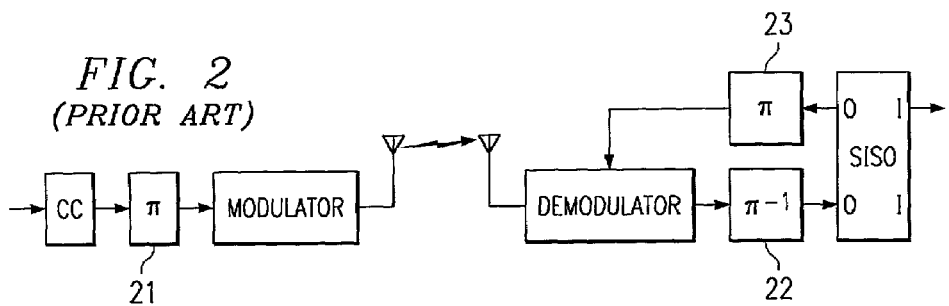
FIG. 2 illustrates a conventional wireless communication system that utilizes turbo coding, interleaving and feedback of a posteriori probabilities from a SISO decoder.

Referring again to FIG. 1, the symbol $Z_t$ received by the antenna of the receiver 12 at time t can be expressed as a function of the corresponding symbols or bits $X_t$ and $Y_t$ produced by the respective convolutional coders of the transmitter 11, and the fading characteristics of the respective wireless communication channels through which $X_t$ and $Y_t$ are transmitted to the receiver 12. The fading characteristics (or coefficients) are illustrated by fading parameters $\alpha$ and $\beta$ in FIG. 1. Accordingly, the symbol value received by the antenna of the receiver 12 can be expressed as follows $$Z_t = \alpha X_t + \beta Y_t + n_t, \qquad (1)$$

where $n_t$ represents noise in the wireless communication channels. At 13, the probability generator 15 produces, for all possible values $C_X$ that $X_t$ can assume at time t, the following probability $$P(X_t = C_X | Z_t = C_Z) \qquad (2)$$

Expression (2) above represents the probability that $X_t = C_X$ given that the received symbol or bit value $Z_t = C_Z$. At 14, the probability generator 15 produces similar probabilities for all possible values $C_Y$ of $Y_t$, namely $$P(Y_t = C_Y | Z_t = C_Z) \qquad (3)$$

Taking the probability defined in Expression (2) above as an example, and applying Bayes' Rule, Expression (2) can be written as follows $$P(Z_t=C_Z|X_t=C_X)P(X_t=C_X)/P(Z_t=C_Z) \quad (4)$$

In practice, for an iterative loop, the probability given by Expression (2) is generated under the assumption that nothing is known in advance about the statistics of $X_t$. This is called the extrinsic probability and ensures that only "new" information is used to generate data that will be fed back. Therefore, $P(X_t=C_X)$ can be eliminated from Expression (4). The denominator of Expression (4) can also be eliminated because it merely represents the probability that $Z_t=C_Z$ at time t, which is merely a constant value that operates only as a scaling factor. Thus, eliminating the aforementioned extrinsic factor and the aforementioned scaling factor from Expression (4) leaves $$P(Z_t=C_Z|X_t=C_X) \quad (5)$$

Using known probability theory, Expression (5) can be rewritten as follows $$\sum_{C_Y} P(Z_t = C_Z | X_t = C_X \text{ and } Y_t = C_Y) P(Y_t = C_Y | X_t = C_X) \quad (6)$$

Referring again to Equation (1) above, the leftmost probability of Expression (6) can be rewritten as follows $$P(n_t = C_Z - \alpha C_X - \beta C_Y) \quad (7)$$

Substituting Expression (7) into Expression (6) gives $$\sum_{C_Y} P(n_t = C_z - \alpha C_X - \beta C_Y) P(Y_t = C_Y | X_t = C_x) \quad (8)$$

Thus, Expression (2) above can be rewritten as Expression (8) above.

The noise $n_t$ in Expression 8 can be modeled as a Gaussian random variable, and the fading parameters $\alpha$ and $\beta$ can be readily estimated. Thus, given that the received symbol $Z_t=C_Z$ is known, values of the leftmost probability in Expression 8 can be easily calculated for all possible values of $C_X$ and $C_Y$. The values of the rightmost probability of Expression (8) are provided according to the invention as the a posteriori output probabilities from a SISO decoder, as described in more detail below.

Using reasoning analogous to that given above for rewriting Expression (2) as Expression (8), Expression (3) above can be rewritten as follows $$\sum_{C_X} P(n_t = C_Z - \alpha C_X - \beta C_Y) P(X_t = C_X | Y_t C_Y) \quad (9)$$

As mentioned above with respect to Expression (8), the leftmost probability of Expression (9) can be easily calculated for a known value of $C_Z$ and all possible values of $C_X$ and $C_Y$. Also analogous to the discussion of Expression (8) above, the values of the rightmost probability of Expression (9) are provided according to the invention as a posteriori output probabilities of a SISO decoder.

Figure 3:
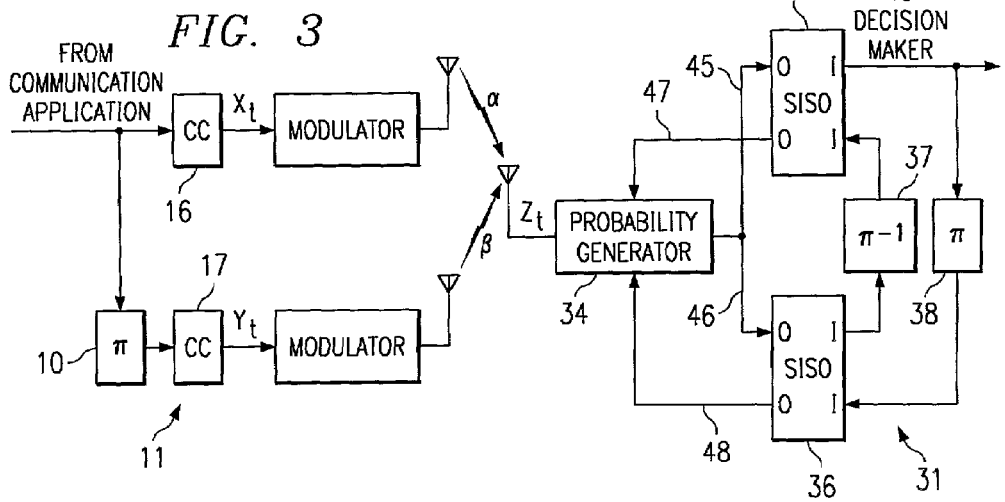
FIG. 3 diagrammatically illustrates exemplary embodiments of wireless communication systems which utilize turbo coding, interleaving, transmit diversity and a posteriori probability feedback according to the invention.

Referring now to FIG. 3, in exemplary wireless communication system embodiments according to the invention, a receiver 31 includes a probability generator 34 coupled to an antenna which receives symbol $Z_t$ from a transmitter that employs transmit diversity, for example the transmitter 11 of FIG. 1. The probability generator 34 calculates the values of the leftmost probability in Expressions (8) and (9). At its input 47, the probability generator receives (as feedback) from SISO decoder 35 the values of the rightmost probability of Expression (9). At its input 48, the probability generator 34 receives (as feedback) from the SISO decoder 36 the values of the rightmost probability of Expression (8). Having calculated the values of the leftmost probability of Expressions (8) and (9), and having received the values of the rightmost probabilities of Expressions (8) and (9) from the SISO decoders 36 and 35, respectively, the probability generator 34 performs the summation of Expression (8) to produce at its output 45 the values of the probability of Expression (2), and also performs the summation of Expression (9) to produce at its output 46 the values of the probability of Expression (3).

The outputs 45 and 46 provide a priori output probabilities to the SISO decoders 35 and 36. The decoder 35 operates with respect to $X_t$ and the decoder 36 operates with respect to $Y_t$. The SISO decoders 35 and 36 use their respective a priori output probabilities to produce respective a posteriori input probabilities. The a posteriori input probabilities produced by SISO decoder 35 are interleaved at 38 (corresponding to the interleaver in the transmitter 11) and the results are provided as a priori input probabilities to the SISO decoder 36. Similarly, the a posteriori input probabilities produced by the SISO decoder 36 are de-interleaved at 37 (again corresponding to the interleaver of the transmitter 11) and the results are provided as a priori input probabilities to the SISO decoder 35. The a posteriori input probabilities produced by the SISO decoder 35 are also provided to a decision maker which can use conventional techniques to decide the input symbol (as seen by the corresponding coder 16) based on the a posteriori input probabilities.

The output probabilities provided to (a priori) and produced by (a posteriori) the SISO decoder 35 represent respective probabilities that the symbol $X_t$ as output from the convolutional coder 16 has respective ones of a plurality of possible values. Similarly, the input probabilities provided to (a priori) and produced by (a posteriori) SISO decoder 35 represent respective probabilities that the symbol that was input to the convolutional coder 16 to produce $X_t$ has respective ones of a plurality of possible values. The SISO decoder 36 functions analogously with respect to the symbol $Y_t$ and the convolutional coder 17. Each SISO decoder uses the a priori probabilities (input and output) provided thereto together with knowledge of the trellis used by the corresponding convolutional coder to produce corresponding a posteriori probabilities (output and input). In some embodiments, each coder 16 and 17 uses the same trellis.

Figure 4:
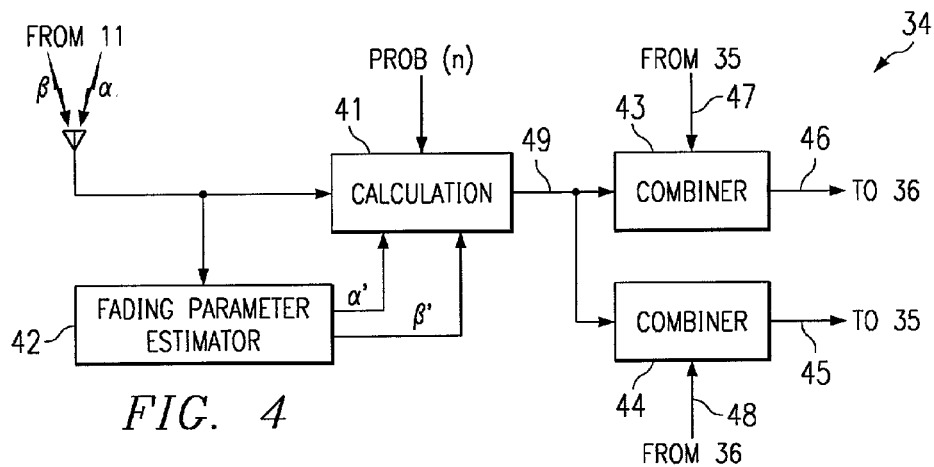
FIG. 4 diagrammatically illustrates exemplary embodiments of the probability generator of FIG. 3.

FIG. 4 diagrammatically illustrates exemplary embodiments of the probability generator 34 of FIG. 3. A fading parameter estimator 42 provides estimates $\alpha'$ and $\beta'$ of the fading parameters $\alpha$ and $\beta$ of FIG. 3 using, for example, any desired conventional technique. A calculation apparatus 41 receives these estimated fading parameters, and also has access (e.g. from look-up table values) to the probability of the noise parameter $n_t$, which can be modeled, for example, as a Gaussian random variable. The calculation apparatus 41 knows the value of $C_Z$ (simply the received value) in Expressions (8) and (9), and thus can calculate the values of the leftmost probability in Expressions (8) and (9) using the estimated fading parameters $\alpha'$ and $\beta'$. Thus, the calculation apparatus 41 produces at 49 the values of the leftmost probability of Expressions (8) and (9). These values are input to combiners 43 and 44.

The combiner 43 receives at 47 the a posteriori output probabilities produced by SISO decoder 35, and the combiner 44 receives at 48 the a posteriori output probabilities produced by SISO decoder 36. The values received at 47 represent the values of the rightmost probability in Expression (9) and the values received at 48 represent the values of the rightmost probability in Expression (8). The combiner 43 operates to combine the values that it receives at 49 and 47 in the manner shown in Expression (8), namely multiplying the values together and summing the resulting products over all possible values of $C_Y$. Similarly, the combiner 44 combines the values that it receives at 49 and 48 as shown by Expression (9) above, namely multiplying the values together and summing the resulting products over all possible values of $C_X$. The combiner 43 produces at 46 the values of the probability shown in Expression (3), and the combiner 44 produces at 45 the values of the probability shown in Expression (2).

It should be clear that the probability generator 34 can easily account for the scaling factor described above with respect to Expression (4) by suitably normalizing the probability values that it generates, although such normalizing is not explicitly shown in the drawings.

Figure 5:
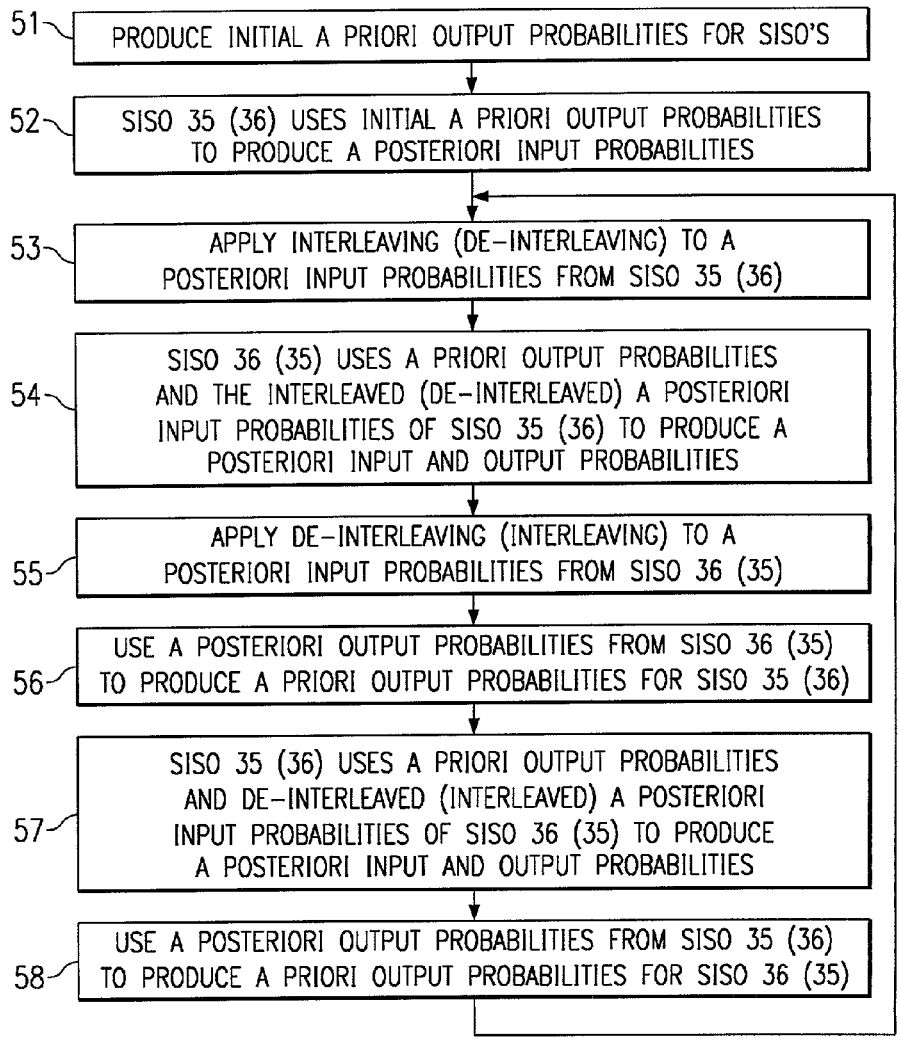
FIG. 5 illustrates exemplary operations which can be performed by the receiver of FIG. 3.

FIG. 5 illustrates exemplary operations which can be performed by the receiver embodiments of FIGS. 3 and 4. At 51, initial a priori output probabilities are produced for the SISO decoders. This can be done, for example, by the probability generator 34 calculating the values of the leftmost probabilities of Expressions (8) and (9) and summing these values without multiplying by the rightmost probabilities of Expressions (8) and (9) (which rightmost probabilities are not yet available as feedback from the SISOs). FIG. 5 assumes that the SISO decoder 35 is selected to operate first and begin the iterative process. However, the SISO 36 could also be selected to operate first and begin the iterative process, and this possibility is therefore indicated by the parenthetical expressions in FIG. 5. The following textual description of FIG. 5 assumes the aforementioned example of beginning with SISO 35.

At 52, SISO 35 uses the initial a priori output probabilities to produce a posteriori input probabilities. At 53, interleaving is applied to the a posteriori input probabilities from SISO 35. At 54, SISO 36 uses the initial (for the first iteration) a priori output probabilities and the interleaved a posteriori input probabilities of SISO 35 to produce a posteriori input and output probabilities. At 55, de-interleaving is applied to the a posteriori input probabilities from SISO 36. At 56, the a posteriori output probabilities from SISO 36 are used to produce a priori output probabilities for SISO 35. At 57, the SISO 35 uses its a priori output probabilities and the de-interleaved a posteriori input probabilities of SISO 36 to produce a posteriori input and output probabilities. At 58, the a posteriori output probabilities from SISO 35 are used to produce a priori output probabilities for SISO 36. The operations at 53–58 are then repeated for any desired number of iterations.

Figure 6:
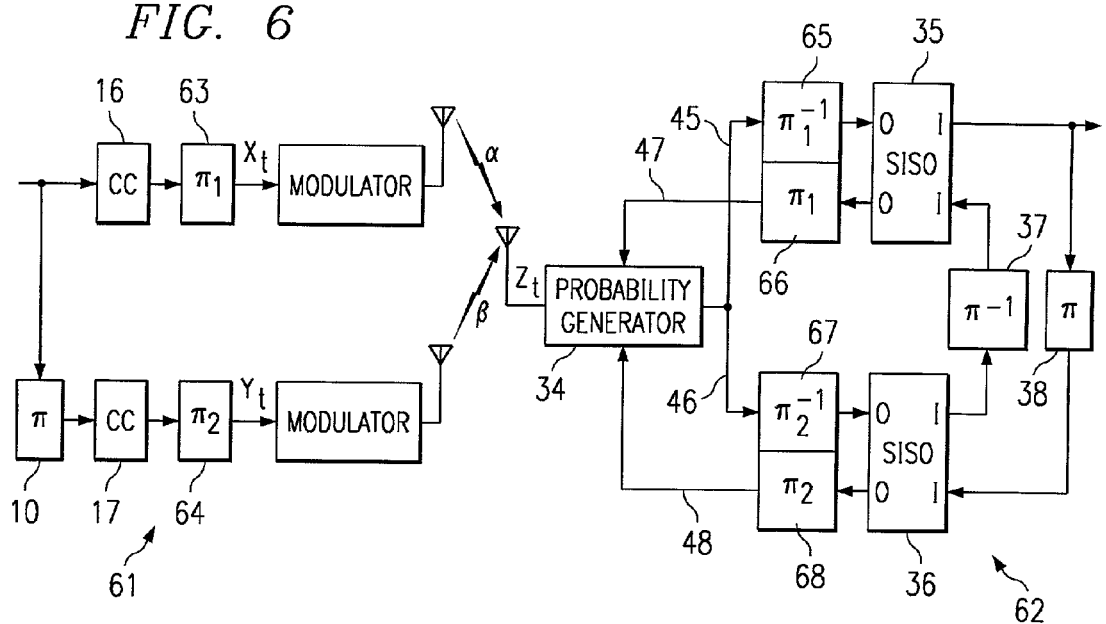
FIG. 6 diagrammatically illustrates further exemplary embodiments of wireless communication systems which utilize interleaving, turbo coding, transmit diversity and a posteriori probability feedback according to the invention.

FIG. 6 diagrammatically illustrates further exemplary embodiments of a wireless communication system according to the invention. In the system of FIG. 6, the transmitter 61 is similar to the transmitter 11 of FIGS. 1 and 3, but includes interleavers 63 and 64 at the outputs of the convolutional coders. Thus, the receiver 62 includes a de-interleaver 65 and an interleaver 66 to account for the operations of the interleaver 63, and also includes a de-interleaver 67 and an interleaver 68 to account for the operation of the interleaver 64. Aside from the operations of the interleavers and de-interleavers illustrated at 63–68, the wireless communication system of FIG. 6 can operate in generally the same fashion as the wireless communication system of FIG. 3, that is, generally as described above with respect to FIG. 5.

Figure 7:
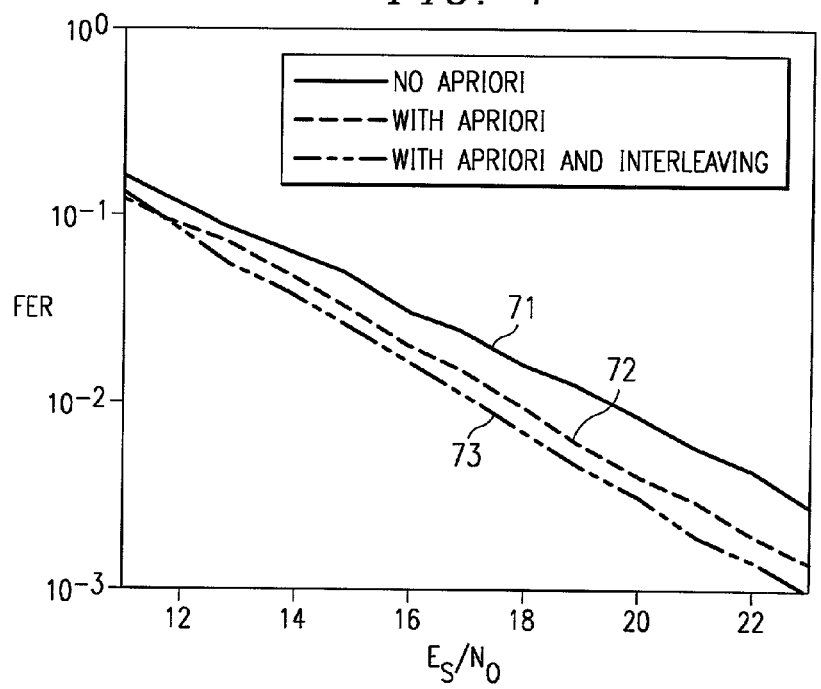
FIG. 7 illustrates exemplary simulation results for the systems of FIGS. 1, 3 and 6.

FIG. 7 illustrates exemplary simulation results for the systems of FIG. 1 (71), FIG. 3 (72), and FIG. 6 (73). As shown in FIG. 7, the FIG. 3 system at 72 performs better (in terms of frame error rate FER) than the FIG. 1 system at 71, showing gains of about 2 dB at higher SNRs. The FIG. 3 system also exhibits a noticeable increase in slope, so the gains can be expected to be even larger at higher SNRs. The FIG. 6 system at 73 provides an additional performance gain of about 1 dB at the higher SNRs, and also exhibits an increase in slope as compared to the system of FIG. 1 at 71.

α

As mentioned above with respect to FIG. 5, either of the SISO decoders 35 or 36 can be selected to operate first and begin the iterative process illustrated in FIG. 5. For example, the upper SISO decoder of FIG. 1 has typically been selected (arbitrarily) to go first in the prior art. According to some embodiments of the invention, the transmit antenna that experienced the deepest fade is identified, and the corresponding SISO decoder is selected to begin the iterative process. The decision can be based, for example, on a simple magnitude computation of the fading coefficients α' and β' of the two channels. The channel associated with the deeper fade will typically result in a lower SNR for the received signal from that transmit antenna. The SISO decoder that goes first has an advantage, because it provides the first estimate of the input symbols. If the SISO decoder associated with the stronger (less faded) channel were chosen to begin the iterative process, it would provide a better first estimate than would the SISO decoder associated with the weaker (more faded) channel. However, if there are any errors, the SISO decoder associated with the weaker channel would have a more difficult time correcting those errors, because the SISO decoder associated with the stronger channel has been given a head start. By operating the SISO decoder associated with the weaker channel first, the operational effects of the two SISO decoders are more closely matched, so they are better able to correct each other by turbo iterations.

Figure 8:
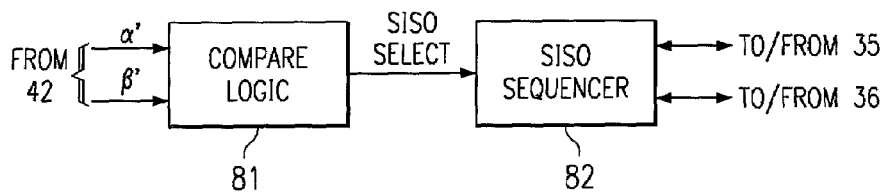
FIG. 8 diagrammatically illustrates pertinent portions of exemplary embodiments of a wireless communication receiver according to the invention.

FIG. 8 diagrammatically illustrates pertinent portions of exemplary embodiments of a wireless communication receiver according to the invention. As shown in FIG. 8, compare logic 81 is operable to compare the fading coefficients of the two channels (see also FIGS. 3, 4 and 6) and determine which channel has deeper fading. The compare logic 81 outputs a SISO select signal indicative of the SISO decoder associated with the more deeply faded (weaker) channel. A SISO sequencer 82 receives the SISO select signal and, in response thereto, begins to sequence the iterative process of the SISO decoders, as illustrated generally in FIG. 5. The SISO sequencer 82 first enables the SISO decoder associated with the weaker channel. After the weaker channel SISO decoder has completed its operation, the sequencer 82 then enables the other SISO decoder. The sequencer 82 thereafter continues to sequentially enable the SISO decoders in alternating fashion to implement the iterative process illustrated in FIG. 5.

In other exemplary embodiments, the fading parameter estimator 42 (see FIG. 4), compare logic 81 and SISO sequencer 82 can be used in the same general fashion described above to select which SISO decoder goes first in receivers such as shown at 12 in FIG. 1.

Figure 9:
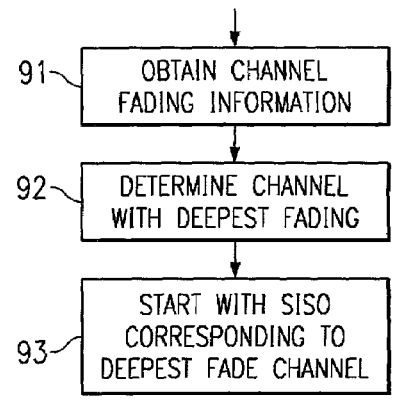
FIG. 9 illustrates exemplary operations which can be performed by the embodiments of FIG. 8.

FIG. 9 illustrates exemplary operations which can be performed by the embodiments of FIG. 8. At 91, the channel fading information is obtained. The channel with the deepest fading is determined at 92, and at 93 the SISO decoder corresponding to the deepest fade is selected to begin the iterative process.

Figure 10:
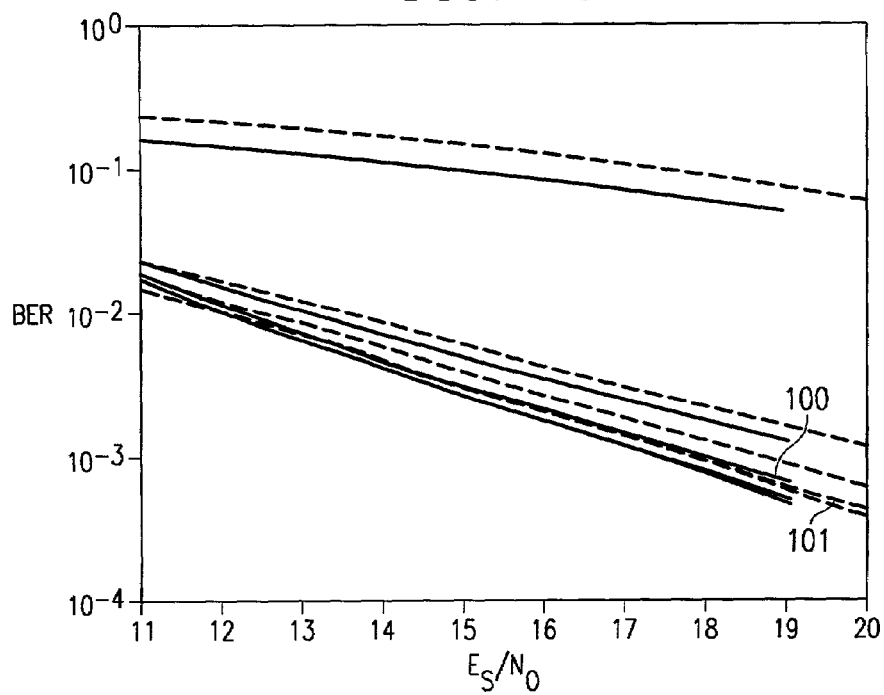
FIG. 10 illustrates exemplary simulation results associated with the embodiments of FIGS. 8 and 9.

FIG. 10 illustrates exemplary simulation results indicative of advantages associated with the embodiments of FIGS. 8 and 9. In particular, FIG. 10 compares the bit error rate (BER) obtained when SISO decoder 35 (see FIGS. 3 and 6) always goes first (dotted lines) with the bit error rate results obtained when the SISO decoder associated with the more deeply faded channel goes first (solid lines). As illustrated in FIG. 10, allowing the SISO decoder associated with the more deeply faded channel to go first provides about a 0.5 dB gain. In addition, the system converges faster as can be seen by noticing that the third iteration of the solid line operation (shown at 100) is located about where the fourth iteration of the dotted line operation (shown at 101) is located. Thus, if there was a quality of service requirement, then the solid line operation should be able to use less computational power, on average, to reach the desired level of error rate.

It will be apparent to workers in the art that any wireless communication system that utilizes a space-time turbo code, or any kind of turbo code, can benefit from the present invention. Advantageously, the added complexity of the a posteriori output probability feedback loops is relatively small compared to the complexity of a SISO block. It will also be apparent to workers in the art that the embodiments of FIGS. 3–6, 8 and 9 can be implemented, for example, by suitable modifications in hardware, software, or a combination of hardware and software, in conventional wireless communication transmitters and receivers.

Although exemplary embodiments of the invention are described above in detail, this does not limit the scope of the invention, which can be practiced in a variety of embodiments.

What is claimed is:

1. A wireless communication receiving apparatus, comprising:
    an antenna for receiving via first and second wireless communication channels a composite communication symbol that represents first and second communication symbols which are respectively associated with said first and second wireless communication channels and which correspond to respective results of first and second coding operations performed by a transmitter apparatus on a bit stream and an interleaved version of the bit stream, respectively;
    a probability generator coupled to said antenna and responsive to said composite communication symbol for generating, for each of said first and second communication symbols, a corresponding plurality of probabilities that the communication symbol has respective ones of a plurality of possible values of the communication symbol;
    first and second SISO decoders respectively corresponding to said first and second coding operations and coupled to said probability generator for respectively receiving therefrom the pluralities of probabilities corresponding to said first and second communication symbols, each of said SISO decoders operable for performing a decoding operation on the associated plurality of probabilities; and
    a sequencer apparatus coupled to said first and second SISO decoders, said sequencer apparatus having an input for receiving information about said first and second wireless communication channels, said sequencer apparatus responsive to said wireless communication channel information for controlling said SISO decoders such that one of said first SISO decoder is controllable in response to the sequencer apparatus to perform its associated decoding operation before said second SISO decoder performs its associated decoding operation and such that said second SISO decoder is controllable in response to the sequencer apparatus to perform its associated decoding operation before said first SISO decoder performs its associated decoding operation.

2. The apparatus of claim 1, wherein said wireless communication channel information includes information about both of said wireless communication channels.

3. The apparatus of claim 2, wherein said wireless communication channel information includes information indicative of communication quality in said wireless communication channels.

4. The apparatus of claim 3, wherein said quality information includes information indicative of respective fading characteristics associated with said wireless communication channels.

5. The apparatus of claim 4, wherein said sequencer apparatus is operable for determining from said fading characteristic information that the wireless communication channel associated with said one SISO decoder has more fading than the wireless communication channel associated with said other SISO decoder.

6. The apparatus of claim 3, wherein said sequencer apparatus is operable for determining from said quality information that the communication quality of the wireless communication channel associated with said one SISO decoder is inferior to the communication quality of the wireless communication channel associated with said other SISO decoder.

7. The apparatus of claim 1, wherein said wireless communication channel information includes information indicative of communication quality in said one wireless communication channel.

8. The apparatus of claim 7, wherein said quality information includes information indicative of a fading characteristic associated with said one wireless communication channel.

9. The apparatus of claim 1, wherein said probability generator is operable for generating at least one of said pluralities of probabilities also in response to SISO information received by said probability generator from at least one of said SISO decoders.

10. A method of wireless communication, comprising:
    receiving via first and second wireless communication channels a composite communication symbol that represents first and second communication symbols which are respectively associated with said first and second wireless communication channels and which correspond to respective results of first and second coding operations performed by a transmitter apparatus on a bit stream and an interleaved version of the bit stream, respectively;
    for each of said first and second communication symbols, and responsive to the composite communication symbol, generating a corresponding plurality of probabilities that the communication symbol has respective ones of a plurality of possible values of the communication symbol;

applying to first and second SISO decoders, which SISO decoders respectively correspond to said first and second coding operations, the pluralities of probabilities that correspond to said first and second communication symbols, respectively;

each of said SISO decoders performing a decoding operation on the plurality of probabilities applied thereto; and in response to information about said first and second wireless communication channels, controlling the SISO decoders such that in one instance said first SISO decoder performs its associated decoding operation before said second SISO decoder performs its associated decoding operation and such that in another instance said second SISO decoder performs its associated decoding operation before said first SISO decoder performs its associated decoding operation.

11. The method of claim 10, wherein said wireless communication channel information includes information about both of said wireless communication channels.

12. The method of claim 11, wherein said wireless communication channel information includes information indicative of communication quality in said wireless communication channels.

13. The method of claim 12, wherein said quality information includes information indicative of respective fading characteristics associated with said wireless communication channels.

14. The method of claim 13, including determining from said fading characteristic information that the wireless communication channel associated with said one SISO decoder has more fading than the wireless communication channel associated with said other SISO decoder.

15. The method of claim 12, including determining from said quality information that the communication quality of the wireless communication channel associated with said one SISO decoder is inferior to the communication quality of the wireless communication channel associated with said other SISO decoder.

16. The method of claim 10, wherein said wireless communication channel information includes information indicative of communication quality in said one wireless communication channel.

17. The method of claim 16, wherein said quality information includes information indicative of a fading characteristic associated with said one wireless communication channel.

18. The method of claim 10, wherein said generating step includes generating at least one of said pluralities of probabilities also in response to SISO information produced by at least one of the SISO decoders.

* * * * *